United States Patent Office 3,514,949
Patented June 2, 1970

3,514,949
TURBOPROP FUEL CONTROL FOR USE WITH CONTAMINATED OR VARIED FUELS
John J. Fredlake, Milton F. Keck, and Glennon V. Schwent, Tempe, Ariz., assignors, by mesne assignments, to the United States of America as represented by the Secretary of the Navy
Filed June 18, 1968, Ser. No. 737,958
Int. Cl. F02c 9/08
U.S. Cl. 60—39.28          11 Claims

ABSTRACT OF THE DISCLOSURE

An engine power control system for a turbo-prop engine equipped with a constant speed propeller governor is provided with means to manipulate fuel flow in response to the corrected torque and corrected speed of the engine. The computer section of the engine power control system uses engine oil as the working media. These features enable the use of contaminated fuel, or fuels of varying quality, without requiring filtration or compensating adjustments to the control system.

STATEMENT OF GOVERNMENT INTEREST

The invention defined herein may be manufactured and used by or for the Government of the United States of America for Governmental purposes without the payment of any royalties thereon or therefor.

BACKGROUND OF THE INVENTION

Field of the invention

The invention relates to an engine power control system for a turbo-prop engine that is equipped with a separate constant speed propeller governor. In this arrangerangement, the propeller governor varies the popeller pitch automatically to maintain the engine speed constant while absorbing the power provided by the engine under the control of the engine power control system. The engine power control provides requested power by varying the fuel flow to the engine.

Description of the prior art

Numerous devices have been utilized in the past to provide control of engine speed and torque in a turbine engine. These devices, however, all share the deficiency that they may not operate on fuels of widely varying quality or with high contamination loads without requiring compensating adjustments to the engine power control system and/or filtration of the contaminated fuel.

SUMMARY OF THE INVENTION

The control system of the present invention is designed to perform two basic functions which are advances in the state of the art. These are: (1) control of engine power with a wide variety of fuels without requiring compensating adjustments to the control system; and (2) the ability to operate on highly contaminated fuel without filtration.

To obtain the first of these functions, the control is designed to manipulate fuel flow in response to corrected engine torque and corrected engine speed. The relationship between these two engine parameters is such that multiplication of a given schedule is all that is necessary to accommodate changes in fuel. In fact, all variations attendent to fuel versus power requirements can be compensated for if the correct multiplier is automatically obtained through a comparison of desired uncorrected engine torque with the torque actually being produced by the engine. This amounts to application of an adaptable control system to the gas turbine.

To obtain the second of these functions, the control is designed in two separate sections so that physical separation of contaminated and clean fluids can be accomplished. One section is referred to as the computer section and the other as the fuel metering section. The computer section is supplied with engine oil as the working media, while the contaminated fuel is confined to the metering section. In addition to this unitized construction feature, further design concepts are used which minimize the effects of contamination in the fuel metering portion of the control.

Movement of the power lever for the engine results in the positioning of a fuel scheduling cam and a torque scheduling cam. The fuel scheduling cam provides for an initial amount of fuel to be provided to the engine which is in relation to the position of the power lever. The torque scheduling cam is contoured so as to provide an input to the control system which represents the desired corrected torque at the selected power lever position. Means are further provided to adjust the input of the torque scheduling cam to compensate for changes in ambient temperature and pressure so as to provide an input value relating to the desired uncorrected torque. This value is compared to the actual torque produced by the engine and a fuel scheduling integral multiplier then acts to adjust the fuel metering valve to a position so that the desired torque value is produced by the engine.

BRIEF DESCRIPTION OF THE DRAWINGS

Other objects and advantages of the invention will hereinafter become more fully apparent from the following description of the annexed drawings, which illustrate a preferred embodiment, and wherein.

DESCRIPTION OF THE PREFERRED EMBODIMENTS

The invention is an engine power control for a turboprop engine, the engine being equipped with a constant speed propeller governor. In such arrangement, the propeller governor varies propeller pitch automatically to maintain the engine speed constant as the power provided by the engine changes. The power produced by the engine is controlled by the power control system of the present invention and operates to provide the requested power to the propeller by manipulation of the fuel flow to the engine. Any suitable prior art propeller governor may be utilized with the power control system of the present invention.

The fuel metering section

Figure 1A:
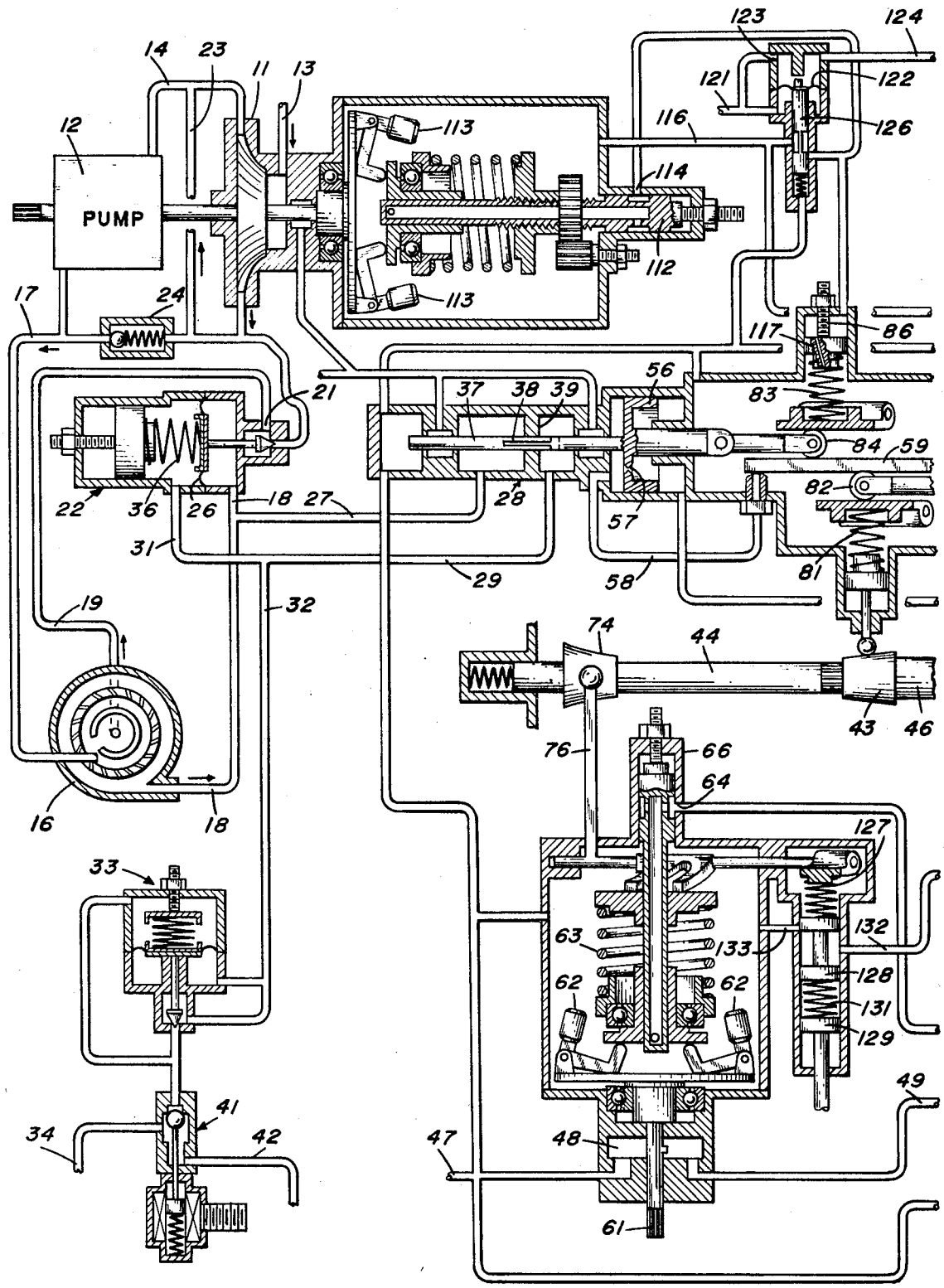
FIG. 1a is a representation of the control system of the present invention in which portions are cut away for greater clarity and which shows the fuel metering section plus a portion of the computer section.
Figure 1B:
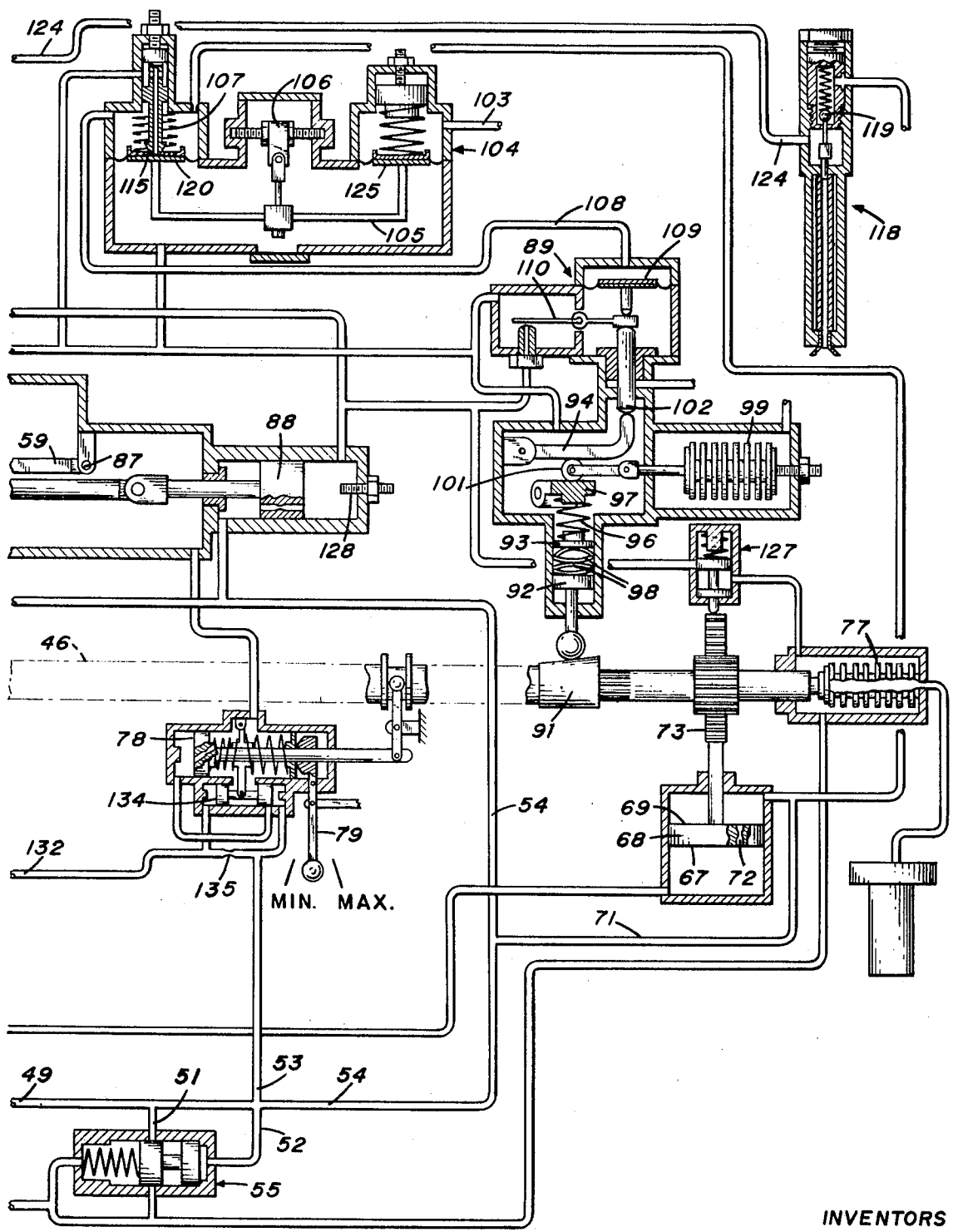
FIG. 1b shows the remainder of the computer section.

Referring now to the drawings wherein like reference characters designate like or corresponding parts throughout the several views, FIG. 1 (which illustrates a preferred embodiment) shows the engine power control system of the present invention. Fuel from the airplane's supply tank is introduced to the boost stage 11 of the high pressure pump 12 through line 13, resulting in an initial rise of pressure of approximately 10 to 20 pounds per square inch. The boost stage 11 of the fuel pump is of the centrifugal type and is integral with the high pressure pump 12. A step-up gear train may be utilized to obtain the speeds required by the boost element. From the boost element 11, the fuel is conducted through line 14 to the high pressure pump 12 where it is pressurized to the level demanded by the engine fuel nozzle characteristics. The pump is engine mounted and can, for example, be driven at 4500 r.p.m. at maximum engine speed. From the main pump 12, the flow is routed to the fuel director 16 through line 17. The fuel director acts to inertially separate the larger portion of the contaminant to outlet line 18 and to direct relatively clean excess fuel from the center part of the director through line 19. Line 19 leads to the supply port 21 of the bypass valve 22. When the bypass valve opens, the relatively clean fuel is returned to the interstage part of the fuel pump through line 23. A relief valve 24 is provided to protect against overloading pressure pump 12.

The relatively contaminated fuel from the fuel director 16 passes through line 18 to one side of a diaphragm 26 in the bypass valve mechanism 22. Branch line 27 allows the fuel to flow to the fuel metering valve 28.

Fuel coming from the metering valve 28 is conducted through line 29 to lines 31 and 32. Line 31 conducts the fuel to the opposite side of diaphragm 26 in the bypass valve 22. Line 32 conducts the fuel to the pressurizing valve 33 from whence it is conducted to the engine nozzle by line 34.

As can be seen more particularly from the drawing, a spring 36 is located in the bypass valve 22 and acts to control the pressure differential across the fuel metering valve. If the pressure in the line 18 coming from the fuel director exceeds the value of the pressure in line 31 coming from the fuel metering valve plus the compression of the spring 36, the bypass valve will open allowing more fuel to pass through line 19, thereby reducing the pressure in line 18. This mechanism insures that the pressure drop between lines 27 and 29 remains constant at a value corresponding to the compression force exerted by spring 36.

The amount of fuel which is conducted through the fuel metering valve is determined by the longitudinal position of fuel plunger 37 which comprises an inclined groove 38. The position of the inclined groove in relation to wall 39 provides a variable size fuel metering opening. Since the drop in pressure across the opening is maintained constant by the bypass valve 22, the amount of fuel metered by valve 28 is proportional to the size of the fuel metering opening as determined by the longitudinal position of plunger 37.

The metered flow resulting from the constant pressure drop and metering valve area modulation is routed to the engine fuel nozzles through the pressurizing valve 33 and the solenoid shut-off valve 41. The pressurizing valve performs the function of providing a sufficient pressure potential at the bypass valve under all operating conditions regardless of the fuel nozzle characteristics. The shut-off valve acts to admit nozzle flow to the engine in one position while draining the engine fuel manifold in the other. Line 42 is directed overboard to ambient pressure. The part of the power control system described so far is termed the fuel metering section.

The computer section

The function of the computer section of this control system is to position the fuel metering valve plunger 37 so that the proper weight flow of fuel is delivered for the engine condition requested by the power lever input and the speed lever input and to provide reasonable system transients within the operating envelope of the engine. These requirements are normal to an engine control system but the uniqueness of the present design lies in the fact that these functions can be met with a variety of fuels ranging from aviation gasoline to diesel fuel without requiring manual compensating adjustments to the fuel control.

The primary engine parameters used for control purposes in this fuel system are engine speed and engine torque. These parameters are ideal for a power control since satisfaction of the torque requirements at a given speed completely defines the engine power in the most direct manner.

Figure 2:
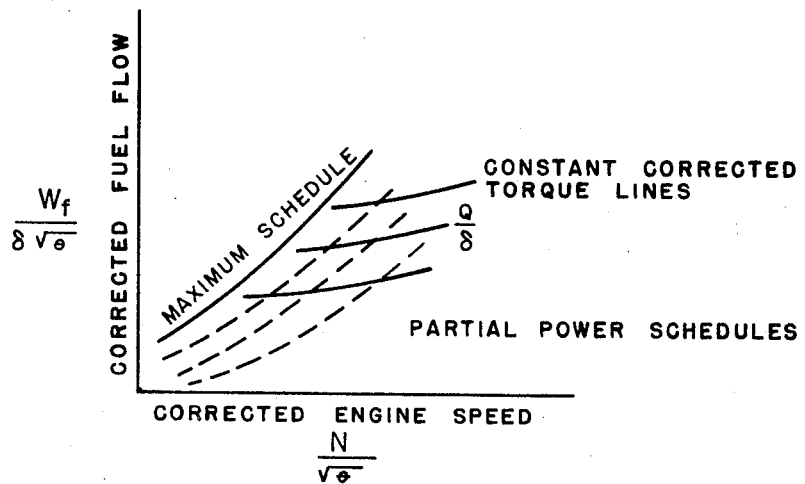
FIG. 2 is a chart showing the relationship of corrected fuel flow to corrected engine speed.

To accomplish the above requirements for a range of fuels, use is made of the relationship existing between fuel flow, engine speed and torque. As seen by FIG. 2, it is possible that by establishing a torque requirement at a given engine speed, a corresponding fuel flow value is required and that if a schedule were introduced into the control system to satisfy these requirements for a given fuel, altitude, and temperature condition, it would only be necessary to multiply this particular schedule by an appropriate value to arrive at satisfactory schedules for other fuels and ambient conditions. This is the principle of operation of this fuel control.

The fuel schedule is established by a three-dimensional cam 43 mounted on a rotatable shaft 44 by means of sleeve 46 so that the cam 43 and sleeve 46 can be translated axially with respect to shaft 44. The cam shaft is positioned as a function of speed and ambient temperature so that the position of the cam shaft is a function of corrected speed. Corrected speed is represented as $N/\sqrt{\theta}$ where N is the actual engine speed and $\theta$ is the ambient temperature divided by the standard temperature. In FIG. 2, $\delta$ is the ratio of ambient to standard pressure, $W_f$ is weight per time of fuel, and Q is uncorrected torque.

The computer section is supplied with engine oil from line 47 as the working fluid. The oil is supplied to a pump 48 which supplies high pressure oil line 49 and branch lines 51, 52, 53 and 54. Lines 51 and 52 in turn supply a servo pressure regulator 55. Branch line 54 supplies high pressure oil to one side of piston 56 which is attached to fuel plunger 37. The oil flows through orifice 57 in the piston and through line 58 to a plate valve 59. The position of the plate valve 59 controls the pressure drop across the piston orifice 57 which in turn acts to axially position the fuel plunger 37 to control the amount of fuel dispensed by the fuel metering section. The friction of the fuel flowing through the metering plunger orifice 38 will offset the friction of the working fluid through piston orifice 57 to position the piston 56, or a separate return spring could be utilized in addition.

Figure 3:
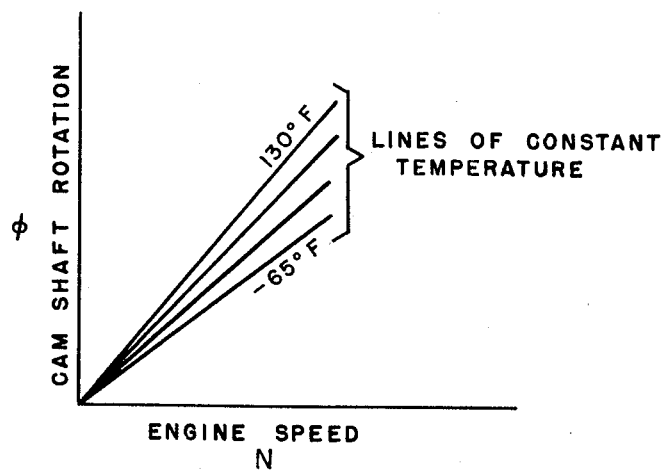
FIG. 3 is a chart showing the relationship of fuel scheduling cam rotation to engine speed for lines of constant temperature.

As discussed above, the fuel schedule is established by the position of cam 43 which is positioned in the following manner: By means of drive shaft 61 the engine speed is sensed by a set of flyweights 62 which act to oppose the force of speed spring 63. When the engine speed increases so that the force of the flyweights is large enough to overcome the spring load, a port 64 is opened in the stationary spindle 66. Opening of the port 64 decreases the pressure on the side 67 of speed piston 68. Side 69 of piston 68 is supplied with high pressure oil through branch line 71 from branch line 54. Orifice 75 maintains a pressure drop across the piston 68 causing axial movement of the piston and the attached rack 73, which causes rotation of shaft 44 to position the cam 43 in a rotated position which corresponds to the actual engine speed. Rotation of the shaft 44 also causes rotation of feedback cam 74, which is fixedly mounted on shaft 44. The rise of the feedback cam 74 is fed back through lever 76 to the speed spring 63, causing the servo port 64 to be returned to its initial condition, thereby reestablishing the force equilibrium across the servo piston 68. The feedback cam is contoured in the axial direction to provide the desired output of corrected speed. To accomplish this result, the feedback cam 74 is moved axially by a liquid-filled thermostat assembly 77 which senses compressor inlet temperature. A chart of typical speed system output would look as shown in FIG. 3. During the axial movement of shaft 44, the sleeve 46 and cam 43 are held in axial position by piston 78 which in turn is resiliently positioned by power lever 79.

The radial contour of the fuel scheduling cam 43 is designed to provide an input signal to the metering plunger moving-mechanism compatible with the desired fuel flow. Movement of this cam axially by power lever manipulation establishes the delivered percentage of maximum available fuel scheduled at any speed.

The signal thus generated by the scheduling cam 43 is introduced into the metering valve plate 59 through a scheduling spring 81 and roller 82. The force of the input signal pivots the servo beam 59 in a direction to open the plate valve, thereby controlling the servo flow from the low pressure side of the metering plunger servo piston. Opening of this plate valve decreases the pressure on the low side of the piston and creates a force to move the piston, and the metering valve which is attached to it, in the increasing flow direction. The reverse happens upon a decrease in speed. A balance spring 83 and roller 84 are arranged on the opposite side of the servo beam 58 to establish the initial metering valve opening desired. A stop 86 is provided to limit the minimum flow.

The distance from the servo beam pivot 87 at which the signal force from the fuel scheduling cam is applied by roller 82 is determined by the position of integral multiplier piston 88. By variously positioning the roller 82 controlled by piston 88 of the integral multiplier, a multiplication of any input to the metering valve servo from the fuel scheduling cam may be obtained. Hence the name, integral multiplier. This feature is utilized to modify the flow schedule to accommodate various fuels and other factors affecting the required schedule.

The integral multiplier piston 88 is made to move in response to a pressure unbalance created by the torque comparator 89. This comparator is supplied with a scheduled signal derived in a manner similar to that of the fuel schedule signal. The shaft 46 on which the fuel scheduling cam is mounted also carries the corrected torque scheduling cam 91 which rotates as a function of speed and is translated by power lever motion in the same manner as the fuel scheduling cam. The radial contour of this cam is designed to provide an input signal which is a function of the desired corrected torque to be produced at any particular power lever setting. The radial contour of the torque scheduling cam 91 positions pistons 92 and 93 to cause pressure against hinged lever 94 through spring 96 and hinged lever 97. Temperature sensitive discs 98 are provided to uncorrect the torque input for variations from standard temperature, and an evacuated bellows 99 is provided to uncorrect the torque signal for variations from standard pressure by moving roller 101 so as to change the effective pressure of hinged lever 94 against plunger 102. Movement of the torque scheduling cam 91 in an axial direction by movement of power lever 79 establishes the delivered percentage of maximum available torque scheduled at any speed.

Line 103 receives a hydraulic pressure directly proportional to the amount of engine torque being produced. This signal is the same signal generated for the conventional torque meter readout and is directed to the torque signal transducer 104 for correction of gain and zero. This is a hydraulic transducer composed of two opposing diaphragms 120 and 125 mounted on a force beam 105 supported by a movable pivot carrier 106. Adjustment of this pivot increases or decreases the lever ratio between the input force and the output force and hence the gain of the signal. Adjustment of the balance spring 107 will adjust the zero torque output signal as is seen more clearly in FIG. 1b. A change in the pressure representing engine output torque will produce a change in pressure in line 108 by movement of plate valve 115 on diaphragm 120, thereby changing the force exerted by diaphragm 109 upon plate valve 110. The force produced by the torque signal transducer 104 is opposed by the force representing the uncorrected torque value input signal from torque scheduling cam 91. In the event of a difference between the actual torque produced by the engine and the programed or scheduled torque, plate valve 110 is moved to raise or lower the pressure on the low pressure side of integral multiplier piston 88, thereby adjusting the position of roller 82 to change the fuel input signal and adjust the fuel metering plunger to equalize the scheduled and actual torque.

Because the integrator functions to modify fuel schedules only, it can be allowed to respond very slowly. This is desirable in that the torque signal from the engine could be noisy or require filtration for smoothness of engine operation and accuracy of setting power. The basic engine response is not dependent upon action of the integrator but only on the proportional speed and power lever controls which can be made adequately fast to provide rapid transients.

The computer section is provided with an additional governor to protect against overspeed of the engine. This device consists of a servo valve 112 which is operated by flyweights 113 so as to open ports 114 when the speed increases above the desired maximum level. Oil from the low pressure side of the integrator piston 88 is supplied to the overspeed governor through line 116 when port 114 is opened. The oil from line 116 is vented to the top of piston 117 which acts as a retainer for balance spring 83 in the metering valve servo unit. This venting action causes both an increase in pressure on the top of piston 117 and a decrease in pressure in the low pressure side of integrator multiplier piston 88. The increase in the pressure above piston 117 acts through the metering valve servo force beam 59 to reduce fuel in proportion to the magnitude of the force created. The decrease in the pressure behind piston 88 causes the integrator to move in the decreasing flow direction. The combination results in both the proportional and integral controls moving to decrease fuel flow and therefore return to a speed within the limits set by the overspeed governor. This also prevents any tendency of the integrator to work against the decreasing amount of fuel supplied by the proportional governor.

Overtemperature protection is provided in the following manner. Air from the compressor discharge is supplied to line 121. This air is supplied to the underside of diaphragm 122 and through fixed orifice 123. The air from the fixed orifice 123 is supplied through line 124 to a normally open bi-metallic thermostat 118 inserted in the exhaust gas stream. Should the set temperature be exceeded for any reason, the thermostat will close valve 119 and build up air pressure on top of diaphragm 122, resulting in movement of shuttle valve 126. This movement vents the pressure in line 116 to the upper surface of piston 117, thereby reducing the pressure on the low pressure side of integrator multiplier piston 88. This results in proportional plus integral action in reducing the fuel flow to control maximum engine temperature, in a manner identical to that employed by the overspeed governor.

In many engines to which this fuel system may be applied, for example the AiResearch gas turbine model TPE 331, a fixed fuel schedule based on speed will be satisfactory for starting the engine with the range of fuels for which the control is designed. Accordingly, the fuel scheduling cam will be contoured in a low speed range (up to 50%) to provide the automatic start schedule. In order to position the integral multiplier in a predetermined location on which to base the start schedule, a low speed integrator lockout 127 is actuated by movement of the speed rack 73. During low speeds, this lockout valve is held open by the speed rack and vents the pressure on the low pressure side of integrator multiplier piston 88, thereby positioning the integrator piston against the minimum flow stop during starting. The fuel schedule represented by the surface of cam 43 is based on this position of the integrator piston.

Beta range operation

In the mode of operation described above, the propeller pitch is utilized to control the speed of the engine under control of a separate propeller governor. The fuel control described above is utilized to control the engine power and incorporate supplementary speed controls. It is sometimes desirable to operate in a mode where the fuel control controls the speed of the engine and the power lever setting controls the blade angle of the propeller. This mode of operation is called beta range and is especially useful during ground handling and reverse thrust operation. Control of the engine during beta range operation is provided by an underspeed governor operating from the mechanical speed feedback lever 76. As discussed above, the motion of this feedback lever is a function of corrected speed, and lever 76 transmits a signal corresponding to the position of cam 74 through a spring 127 to one end of a speed error signal valve 128. The speed error signal valve 128 receives an opposing force from piston 129 and spring 131 which are positioned by the motion of the propeller governor speed lever. During propeller governing of engine speed, this scheduled opposing force keeps the signal valve closed. However, should the speed for any reason drop below the input schedule, the valve will open, allowing pressure from line 132 to bleed through line 133. This enables high pressure oil from line 53 to flow through line 132 by means of orifice 135. The pressure drop across orifice 135 unbalances the pressures on the ends of servo spool 134, thereby moving element 78 in the increasing power direction. This results in the movement of the torque and fuel scheduling cams in the increasing power direction. This action supplies in proportional manner the power required to maintain the scheduled speed as determined by the speed lever setting. The developed thrust is controlled by the power lever movement, which in the beta range is controlling the minimum pitch stop of the prop governor. The schedule of power in the ground handling and reverse thrust range is always less than that required to maintain the scheduled speed to insure operation of the underspeed governor.

Since the control system described herein is principally a power control, it is readily adaptable to conversion to aircraft systems desiring beta operation in the normal mode. Conversion to such a system could be accomplished by supplying a signal valve in the control which, when actuated, would send a signal to the beta control actuator to accomplish the necessary override of propeller pitch. The actuation of this signal valve must be based on the power limits of the engine system. In this system, these limits are physically defined by the axial movement of the power scheduling cams, and the signal valve would be arranged to operate when the axial limits of this movement corresponding to the maximum and minimum power schedules are reached. The remainder of the system could be retained as shown in the drawings. It would, however, probably be advantageous to convert the overspeed limiter to an all speed governor when converting the system to a beta control.

OPERATION OF THE INVENTION

Having described the structure and specific operation of the components of the present invention, the overall operation of the device is as follows. The axial position of the fuel and torque scheduling cams 43 and 91, respectively, is controlled by the setting of power lever 79. Before starting the engine, the power lever 79 is set at a low power setting, thereby positioning the torque and fuel scheduling cams so that their contour provides input for the automatic start schedule. The propellor governor speed lever is set at a relatively low figure. The low speed integrator lockout 127 is contacted by the speed rack 73 at the low starting speed, therefore venting the low pressure side of the integrator piston 88 so that it is held against the stop 128. The fuel schedule is introduced into the fuel metering valve control by pressure of spring 81 and roller 82 against beam 59 so as to control the pressure in line 58 and thereby the position of piston 56 attached to the metering plunger 37. As the speed is increased, flyweights 62 act to open port 64 and vent the low pressure side 67 of piston 68, thereby moving the speed rack 73 in the increasing speed direction and causing rotation of cams 91, 43 and 74. The position of cam 74 corresponds to corrected speed since its axial position is established by thermostat 77. Cam 74 controls a feedback lever 76 which operates on spring 63 to reclose port 64 and reestablish equilibrium across piston 68.

As so far described, the cam 43 provides a fixed input to the metering valve control which does not take into account the variations in power resulting from various fuels that might be used or from varying ambient conditions which may affect engine operation. In order to compensate for variables, the torque scheduling cam 91 is contoured to represent the corrected torque value which it is desired to obtain at the particular power lever setting. This corrected torque input is uncorrected by temperature discs 98 for variations in temperature and by bellows 99 for variations in the standard pressure. The pressure of lever 94 against plunger 102 is therefore representative of the uncorrected torque which should be supplied by the engine for the particular power lever setting. A torque comparator 89 acts to compare this scheduled uncorrected torque with the actual uncorrected torque being produced by the engine. Line 103 receives a pressure signal corresponding to the torque being produced by the engine. Torque pressure transducer 104 acts to provide an opposing signal to plunger 102 thereby controlling plate 110 which controls the bleed from the low pressure side of integrator multiplier piston 88. This positioning of piston 88 insures that the torque produced by the engine is equal to the torque scheduled by cam 91, uncorrected for variations in ambient temperature and pressure. Roller 82 is positioned by piston 88, and by varying the point of pressure of roller 82 on beam 59, the position of beam 59 can be changed for any particular position of cam 43.

Additional overspeed protection is provided by flyweights 113, which act to open port 114, thereby introducing additional pressure to the top of piston 117 to increase the effective pressure of the balance spring 83 in opposition to the fuel schedule input. Opening of port 114 also acts to bleed the low pressure side of integrator piston 88 which then moves in the decreasing speed direction.

Overtemperature protection is provided by a thermostat 118 which acts to move valve 126 to institute pressure on piston 117 and bleeding of piston 88 as in overspeed protection so as to reduce the fuel flow to control engine temperature.

Beta range operation is facilitated by an underspeed governor. Corrected speed input from cam 74 is transmitted through lever 76 to plunger 128 which is positioned by interaction between the lever 76 and the prop governor speed level which controls the position of piston 129. When speed drops below the scheduled value, line 132 drains through line 133, thereby controlling the position of piston 134 which moves the axial position of the fuel and torque scheduling cams toward the increasing speed direction.

It can be seen from the above description that the present invention provides a novel means for enabling operation of the governor system with fuels of varying quality and contamination without requiring compensating adjustments to the governor control system.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An engine power control comprising:
   means for controlling fuel flow to an engine;
   a power lever;
   a fuel scheduling means responsive to the power lever position for generating an engine speed compensated signal to set the fuel controlling means at a first setting corresponding to an estimate of the setting necessary to produce the fuel flow required for the selected power;
   a torque scheduling means responsive to the power lever position for giving an indication of the desired torque at the selected power and speed;
   means for indicating the torque actually produced by the engine;
   means for comparing the indication of desired torque with the indication of the torque actually produced by the engine; and
   means responsive to the comparing means for moving the fuel flow controlling means to a second setting which will supply enough fuel to produce the desired power.

2. The engine power control of claim 1, in which the means for controlling fuel flow to the engine comprises:
   an axially reciprocable fuel plunger; and
   means on said fuel plunger for controlling the amount of fuel to the engine as a function of the axial position of the plunger.

3. The engine power control of claim 1, in which the fuel scheduling means for setting the fuel flow controlling means comprises:
   a fuel scheduling cam; and
   means for axially positioning the fuel scheduling cam in response to the power lever setting.

4. The engine power control of claim 1, in which the torque scheduling means for indicating the torque desired at the selected power comprises:
   a torque scheduling cam;
   means for receiving an indication of the rise of the torque scheduling cam;
   means for compensating the indication of the rise of the torque scheduling cam for variations from standard temperature and pressure; and
   means for axially positioning the torque scheduling cam in response to the power lever setting.

5. The engine power control of claim 4, in which:
   the means for receiving an indication of the rise of the torque cam is a plunger;
   the means for varying the indication according to variations from standard temperature comprises a first element which changes in length with temperature; and
   the means for varying the indication according to variations from standard pressure comprises a hinged lever and a pressure-responsive bellows attached to a movable second element, said first and second elements being located between the plunger and the hinged lever;
   whereby pressure from the cam surface is transmitted through the plunger, first element, and second element to the hinged lever so that the pressure exerted by the hinged lever is adjusted by changes in length of the first element in response to variations from standard temperature and by a change in the moment arm of the force from the cam caused by movement of the pressure-responsive bellows in response to changes from standard pressure.

6. The engine power control of claim 5, in which the means for indicating the torque actually produced by the engine comprises:
   means for creating a pressure on a third element proportional to the torque produced by the engine; and
   further comprising a first plate valve located between the hinged lever and the third element;
   whereby the plate valve is positioned by the opposing pressures of the hinged lever and third element.

7. The engine power control of claim 2, in which the fuel scheduling means for setting the fuel flow controlling means comprises:
   a fuel scheduling cam;
   means for axially positioning the fuel scheduling cam in response to the power lever setting;
   a piston attached to said fuel plunger;
   means for supplying fluid under pressure to one side of the piston;
   means for venting pressure from the other side of the piston; and
   means operated by the fuel scheduling cam face for controlling the venting means;
   whereby the fuel scheduling cam controls the axial position of the fuel plunger.

8. The engine power control of claim 7 wherein:
   the means for venting pressure from the other side of the piston is a hinged servo beam acting as a plate valve; and
   the means operated by the fuel scheduling cam face for controlling the venting means comprises
   a first member lifted by the fuel scheduling cam; and
   a second member between the first member and the servo beam;
   whereby lifting of the servo beam by the first and second members acts to control the degree of venting of the plunger piston.

9. The engine power control of claim 7 further comprising:
   an orifice through the plunger piston;
   whereby fluid from the high pressure side of the piston is supplied to the plate valve.

10. An engine power control comprising:
    an axially reciprocable fuel plunger;
    means on said fuel plunger for controlling the amount of fuel to the engine as a function of the axial position of the plunger;
    a power lever;
    a fuel scheduling cam;
    a first piston attached to the fuel plunger;
    means for supplying fluid under pressure to one side of the first piston;
    a hinged servo beam acting as a first plate valve to vent the other side of the first piston;
    a first member positioned by the surface of the fuel scheduling cam;
    a second member between the first member and the servo beam;
    a torque scheduling cam contoured to represent the corrected torque characteristics desired of the engine;
    a third member positioned by the torque cam;
    a fourth member positioned by the third member and capable of changing length with variations from standard temperature;
    a hinged lever;
    a movable fifth member located between the fourth member and the hinged lever;
    a pressure-responsive bellows attached to the fifth member for moving it in response to variations from standard pressure;
    means for axially positioning the torque scheduling cam in response to the power lever setting;
    means for creating a pressure proportional to the torque produced by the engine on a sixth member;
a second plate valve located between the hinged lever and the sixth member;
a second piston connected to the second member;
means for supplying fluid under pressure to one side of the second piston;
means connecting the second plate valve with the other side of the second piston,
whereby the second plate valve vents the other side of the second piston in response to the comparison of desired and actual uncorrected torques to cause movement of the second element to change the amount of fuel fed for a given position of the fuel scheduling cam.

11. The engine power control of claim 10, further comprising:
a shaft for mounting the fuel and torque scheduling cams; and
means for rotating the shaft to a position corresponding to the corrected speed of the engine.

References Cited
UNITED STATES PATENTS

| | | | |
|---|---|---|---|
| 2,657,530 | 11/1953 | Lee. | |
| 2,667,935 | 2/1954 | Woodward. | |
| 2,795,107 | 6/1957 | Haworth et al. | |
| 2,977,756 | 4/1961 | Stone | 60—39.28 |
| 2,978,034 | 4/1961 | Wente. | |
| 3,019,602 | 2/1962 | Plummer | 60—39.28 |
| 3,023,801 | 3/1962 | Kinney | 60—39.28 X |
| 3,103,785 | 9/1963 | Williams et al. | 60—39.28 |
| 3,139,922 | 7/1964 | Peczkowski | 60—39.28 |
| 3,152,444 | 10/1964 | Peczkowski et al. | |
| 3,309,868 | 3/1967 | Downing et al. | 60—39.28 X |

AL LAWRENCE SMITH, Primary Examiner